United States Patent [19]

Faulhaber

[11] 4,267,477

[45] May 12, 1981

[54] ELECTROMOTOR

[75] Inventor: Fritz Faulhaber, Vernate, Switzerland

[73] Assignee: Retobobina Handelsanstalt, Fürstentum, Liechtenstein

[21] Appl. No.: 17,137

[22] Filed: Mar. 5, 1979

[30] Foreign Application Priority Data

Mar. 23, 1978 [DE] Fed. Rep. of Germany ....... 2812937

[51] Int. Cl.³ .............................................. H02K 1/24
[52] U.S. Cl. ..................................... 310/266; 310/154
[58] Field of Search ..................... 310/266, 154, 90, 89

[56] References Cited

U.S. PATENT DOCUMENTS

| 2,952,788 | 9/1960 | Völkerling et al. | 310/266 |
| 3,128,402 | 4/1964 | Amick, Jr. | 310/266 X |
| 3,237,036 | 2/1966 | König | 310/266 |
| 3,675,102 | 7/1972 | Sidorov et al. | 310/266 |
| 3,860,267 | 11/1958 | Hayes | 310/266 |
| 4,136,294 | 1/1979 | Aubert et al. | 310/266 X |

*Primary Examiner*—Donovan F. Duggan
*Attorney, Agent, or Firm*—Michael J. Striker

[57] ABSTRACT

An electromotor includes a hollow elongated housing, a motor shaft rotatably mounted in the housing and a magnet surrounding the motor shaft. A winding is installed in a circumferential gap between the inner surface of the hollow housing and the outer surface of the magnet. The magnet has one end portion supported on the motor shaft and another end portion supported on the housing.

7 Claims, 1 Drawing Figure

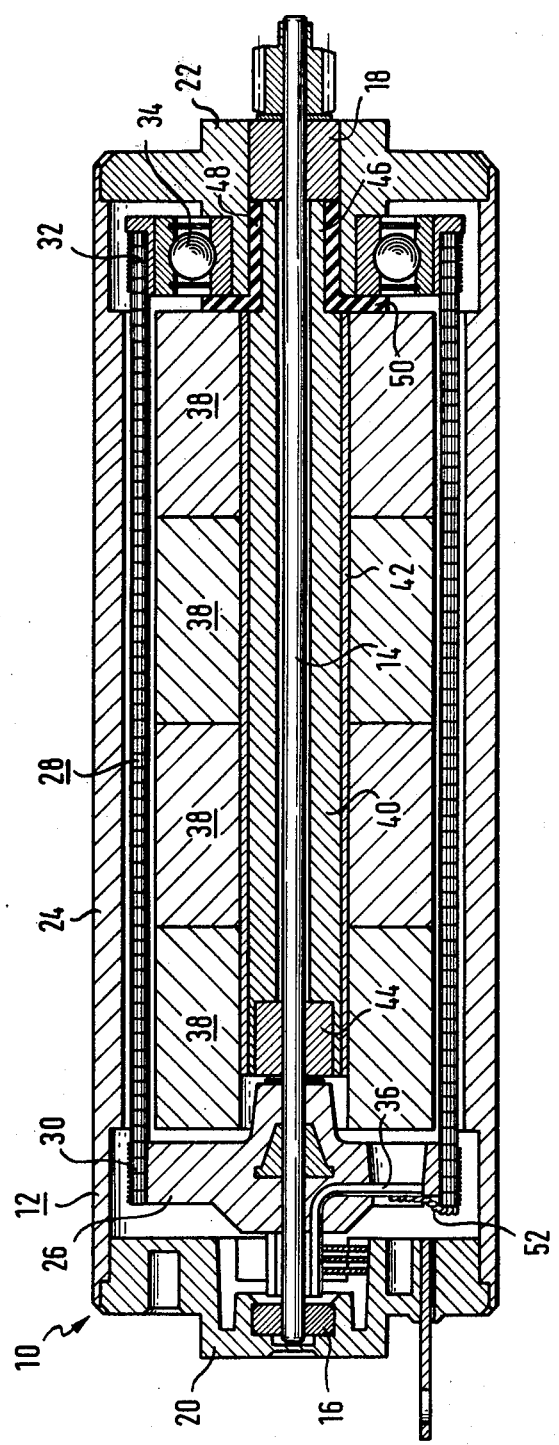

ELECTROMOTOR

BACKGROUND OF THE INVENTION

The present invention relates to electromotors. It is known in the prior art to provide an electromotor having a hollow housing, a motor shaft rotatably mounted in the housing and a magnet surrounding the motor shaft. A winding is installed in a circumferential gap between the inner surface of the housing and the outer surface of the magnet.

It has been recognized that the longer the axial extent of the motor the better the torque, efficiency and the space factors of the copper winding of the motor. The winding may be fixedly connected at one end thereof to a collector ring mounted on the motor shaft for rotation therewith. However, if in such long motors the number of revolutions is relatively high, then the winding tends to flutter with the potential danger that it may rub against the inner surface of the housing and/or the outer surface of the magnet.

It has already been suggested to rotatably support the other end of the winding (i.e. the end thereof which faces away from the collector ring) in a bearing mounted in the housing. Such an arrangement ensures a reliable and secure positioning of the winding relative to the inner surface of the housing and the outer surface of the magnet during rotation of the motor shaft even at high rotational speeds. However, it does not perform the same function for the magnet which is not so retained against partial changes under certain conditions.

SUMMARY OF THE INVENTION

It is a general object of the present invention to avoid the disadvantages of the prior art electromotors.

More particularly, it is an object of the present invention to provide such an electromotor which ensures a reliable and secure positioning of the magnet in the motor.

Another object of the present invention is to provide an electromotor with a magnet which is reliably held in a predetermined position in the motor.

In pursuance of these objects and others which will become apparent hereafter, one feature of the present invention resides in providing an electromotor having a hollow elongated housing and a motor shaft in said housing for rotation relative thereto. Electromagnetic means are provided for rotating the motor shaft. The electromagnetic means include at least one elongated magnet extending in the hollow housing substantially along the elongation thereof and having an end portion and another end portion spaced from said one end portion along the elongation of the magnet. There are further provided means for so supporting said magnet in the hollow housing that the one end portion of the magnet is supported on said motor shaft whereas the other end portion of the magnet is supported on the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is an axial section through an electromotor in accordance with the present invention.

DESCRIPTION OF THE PREFERRED EMBODIMENTS

As can be seen in the FIGURE the reference numeral 10 designates in toto an electromotor which includes a hollow housing having a portion 24 which constitutes a return member of the motor's magnetic circuit. The housing 12 has end caps 20 and 22 which close the housing at the respective open ends thereof.

Each of the caps 20 and 22 is provided with a motor-shaft bearing 16 and 18, respectively, for rotatably supporting a motor shaft 14. A collector ring 26 is mounted on the motor shaft 14 adjacent to the cap 20. The collector ring 26 is provided with conductors 36, which are known in the art. The conductors 36 serve to transmit the electric energy to the electromotor 10 during the working cycle of the latter.

The motor 10 is further provided with a magnet 38, which may, for example, include a plurality of separate magnetic elements.

An outer surface of the magnet 38 is circumferentially spaced from an inner surface of the housing 12. An elongated winding 28 is located in the circumferential gap between the outer surface of the magnet 38 and the inner surface of the housing 12.

A front (i.e. if viewed in the FIGURE) end portion 30 of the winding 28 is fixedly connected to the collector ring 26 (i.e. to the periphery thereof). A rear end portion 32 of the winding 28 is fixed to the outer ring of a ball bearing 34. The inner ring of the ball bearing 34 is installed on a cylindrical portion of the cap 22. Thus, the winding 28 is secured at both ends thereof, for example, by means of corresponding connecting elements, to the collector ring 26 and the outer ring of the ball bearing 34, respectively. The connecting elements are known per se and, therefore, do not require a detailed discussion. The winding 28 is connected to the conductors 36 by means of an electric connection 52.

On the one hand, the magnet 38 is supported, at one end thereof, on the motor shaft 14. On the other hand, the magnet 38 is supported at the other end thereof on the housing 12, namely on the cap 22.

The separate magnetic elements 38 are installed on an intermediate tube 42 which is mounted on a tubular element 40. The motor shaft 14 extends throughout the tubular element 40. The tubular element 40 has a first end portion which faces towards the collector ring 26 and a second end portion which faces away from the collector ring 26 and towards the cap 22. The first end portion of the tubular element 40 is provided with a bearing bush 44 which is directly supported on the motor shaft 14. Thus, the tubular element 40 and the magnet 38 are supported on the motor shaft 14, i.e. at a portion thereof which is adjacent to the collector ring 26.

The second end portion of the tubular element 40 is provided with a formation 46 which is supported by the cap 22.

The motor shaft 14 is supported at three supporting points, provided the formation 46 is rigidly inserted (i.e. with a certain tension) in the cap 22, namely at the respective bearings 16 and 18, and at the bearing bush 44. An elastic sleeve 48 is received between the outer surface of the formation 46 of the tubular element 40 and the inner surface of a central hole of the cap 22. The elastic sleeve 48 has an annular shoulder portion 50 which separates the corresponding end face of the magnet 38 from the ball bearing 34.

The sleeve 48 may be of synthetic plastic material. In the preferred embodiment of the present invention, the sleeve is of rubber and preferably of relatively rigid rubber. It is true, however, that the three-point support of the motor shaft might complicate (i.e. limit) the process of arranging the magnet 38 relative to the housing 12. In order to compensate for the negative effect by the three-point-support arrangement, it is important to provide the sleeve 48 with a sufficient degree of elasticity so as to permit an angular movement of the bearing bush 44 (i.e. with the tubular element 40 with the magnet 38) relative to the motor shaft 14 when the formation 46 of the tubular element 40 is supported via the elastic sleeve 48 in the cap 22.

Thus, the three-point-support arrangement will not negatively affect the process of arranging the magnet 38 on the electric motor 10.

The construction of the present invention renders it possible to install a relatively long magnetic core, i.e. including a considerable number of magnetic elements 38, which is supported on the housing 12 via the elastic sleeve 38 and on the motor shaft 14 via the bearing bush 44.

It will be understood that each of the elements described above, or two or more together, may also find a useful application in other types of electromotors differing from the types described above.

While the invention has been illustrated and described as embodied in an electromotor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromotor comprising a hollow elongated housing; a motor shaft mounted within said housing for rotation relative thereto; electromagnetic means located within said housing and adapted for rotating said shaft; said electromagnetic means having at least one elongated magnet extending along the elongation of said housing and an elongated winding surrounding said magnet and adapted for rotation together with said shaft, said magnet having a first end portion and a second end portion; and means for supporting said magnet within said housing, said supporting means including a tubular elongated element supporting said magnet and surrounding said motor shaft and having a front end portion and a rear end portion, a supporting element mounted on said shaft and adapted for supporting said front end portion of said tubular element on said shaft so as to allow the rotation of said shaft relative to said tubular element, and an elastic supporting bush mounted within said housing and engaging said magnet and adapted to receive said rear end portion of said tubular element whereby said first end portion of said magnet is supported on said motor shaft whereas said second end portion of said magnet is supported on said housing.

2. An electromotor as defined in claim 1, wherein said housing has an inner surface, said magnet having an outer surface circumferentially spaced from said inner surface so as to constitute a circumferential gap between said inner and outer surfaces; said elongated winding extending in said circumferential gap.

3. An electromotor as defined in claim 2, wherein said electromagnetic means further include a collector ring mounted on said motor shaft for rotation therewith; said winding having a first end fixedly connected to said collector ring and a second end.

4. An electromotor as defined in claim 3; and further comprising a bearing adapted for rotatably supporting said second end portion of said winding.

5. An electromotor as defined in claim 2, wherein said supporting bush is of elastic material with sufficient degree of elasticity so as to permit a certain degree of an angular displacement of said tubular element with said magnet when the latter is in assembly with said housing.

6. An electromotor as defined in claim 5, wherein said supporting bush is of synthetic plastic material.

7. An electromotor as defined in claim 6, wherein said supporting bush is of rubber.

* * * * *